United States Patent Office 2,776,360
Patented Jan. 1, 1957

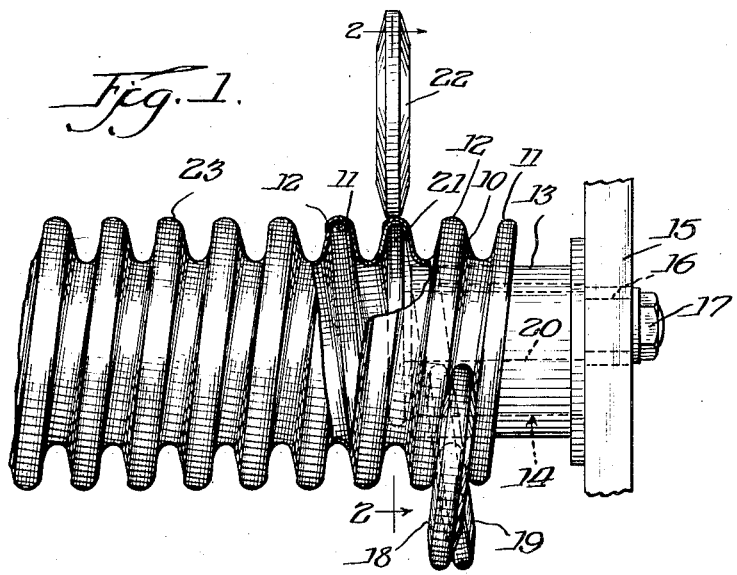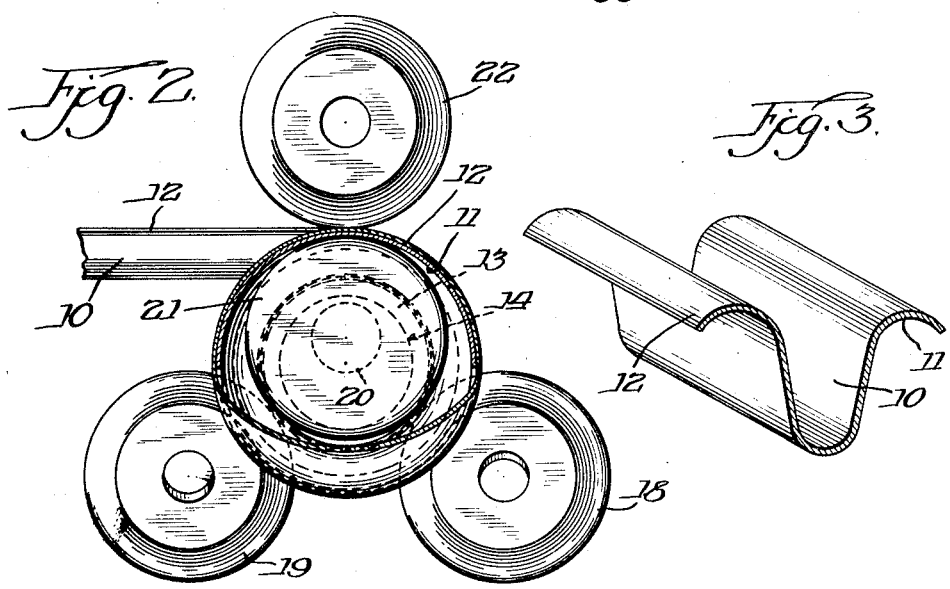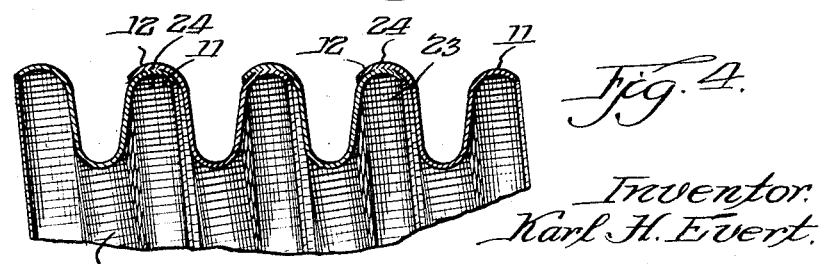

2,776,360

APPARATUS FOR FORMING FLEXIBLE METAL TUBING

Karl H. Evert, Bartlett, Ill.

Application December 1, 1953, Serial No. 395,415

7 Claims. (Cl. 219—62)

My invention relates to apparatus for and method of making flexible metal tubing and has particular reference to the making of flexible tubing of the usual corrugated type which is formed of a very thin flexible strip of metal of approximately .002 to .012" in thickness preformed generally into U-shape, with curved base portions extending outwardly from the legs of the body of the U-shaped strip and which is spirally wound about a mandrel, with the extensions overlapping at the crown portions of the corrugations of the tube and the overlapped extensions being homogeneously welded together at such crown portions into a continuous tube of any desirable length or size.

Another object of my invention is to provide a means whereby a flexible tube is welded at the crowns of the corrugations, thereby producing a flexible tube which possesses superior strength and longer life in use and service than has been possible with tubes heretofore formed and now on the market in substantially the same form which are formed from drawn material or longitudinally welded into a rigid tubing.

Another and further object of my invention is the provision of apparatus and a method of making a tube in which lateral flexure is possible throughout the body of the tube except at the crown portions and which, because of the two thicknesses of material being homogeneously welded together, produces a joint at the crown which is less flexible than other portions of the material but increases the resistance of the tube to internal or external pressures or to crushing forces from without, thereby producing a stronger and more lasting tube than what has been possible heretofore.

Another and further object of my invention is the provision of apparatus in which a homogeneous weld is produced at the crowns of the corrugations by adequate heat and pressure applied at this point of contact of welding rollers with the overlapped edges of the metal strip without the use of wires or the like or other built up means through which an electric current is difficult to maintain and with sufficient pressure on the heated metal to insure a homogeneous weld which has not heretofore been possible with the apparatus employed and the methods used.

Another and further object of my invention is the provision of apparatus by means of which flexible tubing of exceedingly long lengths can be produced, almost to endless lengths, if desired, without the necessity of using wires, which must be removed from lengths of the tubing or from any other form of removable mandrel used in the welding process which has had the effect of limiting the lengths of tubing which it has been possible to manufacture heretofore, which tubing is now in demand for use in jet types of planes and similar types of mechanisms employing jet propulsion.

Another and further object of my invention is the provision of apparatus for the making of flexible metal tubing which has the trips welded together at the crowns and by such welding the flexibility of the tube is retained, but flexure at the outer portions is materially lessened, particularly where the tubes are bent around corners, and the like, so that a much stronger and longer-lived tube is produced by welding of the tube at the crowns of the corrugations.

My invention will be more fully and better understood by reference to the accompanying sheet of drawings, which shows an apparatus and method of use made in accordance with my invention which is somewhat diagrammatic in form, and in which—

Fig. 1 is a view partially in elevation and partially in section showing the forming and welding apparatus for making a flexible tube.

Fig. 2 is a sectional view on line 2—2 of Fig. 1.

Fig. 3 is a perspective view of a pre-formed metal strip prior to its being wound into tube form.

Fig. 4 is a sectional view showing the overlapped strip of material welded at the crowns of the corrugations by my improved apparatus.

Referring now specifically to the drawings and in which like reference characters refer to like parts throughout, a thin flexible strip of steel 10 is shown which is profiled or fashioned into a strip generally U-shape in form and having curved dependent flanges 11 extending outwardly from the legs of the U-form on each side of the body of the U, which profiling formation of the strip is performed normally by means of rolling machines into which flat strips of material are fed and which are gradually profiled or converted into the profile shown in Fig. 3 of the drawings by means of a plurality of sets of rolls, which operation is old in the art and well known to those skilled in the art of making flexible tubing.

The apparatus by means of which the tube of my invention is formed and the method followed are illustrated particularly in Figs. 1 and 2 of the drawings wherein a mandrel 13 is provided which is mounted upon a core 14 and which may, if desired, be connected by suitable gears to be power rotated upon the core 14 as an axle, which core 14 is mounted in a frame 15 by means of a stud 16 having a threaded nut 17 on the outer end thereof and which holds the core 14 in suitable fixed relation during the operation of the device. A pair of rollers 18 and 19 is provided which are power driven by any suitable apparatus and which are located below and to one side of the mandrel 13, and are angularly disposed slightly either in the bearings upon which they are mounted upon the shafts or by canting the axles slightly on which the rollers 18 and 19 are mounted in opposite directions to conform to the pitch of the tube as it is formed about the mandrel 13. The rollers 18 and 19 are adapted to fit into the valleys of the corrugations of the profiled strip or into the inner portion of the U-form with a fairly tight fit so that as they rotate they draw the strip of material about the mandrel 13 as the strips are angularly fed onto the mandrel 13 into spiral form in the final shape of the tube. A shaft 20 is provided which is eccentrically mounted in the core 14, and has a roller 21 mounted at the end thereof, also slightly angularly disposed, so as to fit into the inside of the crown of the tube as the metal strip is wound about the mandrel 13 in the operation of the device. The internal roller 21 is of a smaller diameter than is the diameter of the tube being formed and is concentric with the axis of the shaft 20 upon which it is mounted, so the axis of rotation of the roller 21 is eccentric to the axis of the tube being formed. The roller 21 is loosely mounted on the shaft 20 so that its peripheral speed is the same as the speed of the strip of material passing over the mandrel. An external roller 22, angled slightly to conform to the pitch of the corrugated tube, is provided which engages upon the outer surface of the crowns and is connected to suitable electric apparatus such as a transformer, or the like, and which engages upon the overlapped extension of the strip 10 as it is wound about the mandrel 13 during the transformation of the thin strip of metal into the flexible tube. The shaft 20 has a suitable electric connection leading back to the source of electric current and insulated from the balance of the apparatus so that as the tube is formed the current passes through the roller 22 to the contacting portions of the strip 10 at the crown thereof through the roller 21 and the shaft 20, thereby completing the electric circuit and heating the strip of material as the strips of metal are spirally wound around the mandrel as shown particularly in Fig. 1. The peripheral speed of the roller 22 is the same as the speed of travel of the strip over the mandrel, so an even pressure point is maintained on a line passing through the axes of the rollers 21 and 22 through the point of weld of the strip of material, insuring a complete and homogeneous weld of the material without slippage of either of the rollers 21 or 22 upon the surface of the metal tubing.

In the formation of the tube the profiled strip 10 is fed over the top of the mandrel 13 in an angular direction around the mandrel 13 and is engaged by the rollers 18 and 19 and thence upward between the rollers 21 and 22, thereby forming the strip 10 into a continuously formed helical tube, with the rollers 18 and 19 being power driven and exerting a pulling force upon the strip 10 as it passes around the mandrel 13, with the strip having the extension at one side of the strip continuously overlapping as the strip is wound about the mandrel to form the crown portion of the corrugation and the overlapped edges of the profiled strip passing between the rollers 21 and 22 where, because of the passage of electric current therethrough, the material of the strip is heated sufficiently to be pressed together in tight, welded form due to the pressure between the rollers 21 and 22, thereby forming a homogeneous weld at the crown of the corrugations and producing a continuous tube 23 which has its welds 24 at the tops of the corrugations, with a continuous operation producing the strips of any length desired which pass from the machine into a suitable form of coiling mechanism, which forms no part of my present invention.

From the foregoing description it is believed that the operation of the apparatus and the method followed will be readily and completely understood in that the profiled strips of material are fed into the welding apparatus over the mandrel 13, and as they are fed into this machine are helically wound about the mandrel 13, with the extension at one side of the strip being constantly overlapped and nested together by the rollers 18 and 19 as they pass between the welding rollers 21 and 22. The roller 21 is eccentrically mounted with respect to the horizontal axis of the tube and of a lesser diameter than is the diameter of the tube so that it engages against the inner surface of the crowns of the corrugations opposite the roller 22 and pressure is exerted upon the overlapped edges of the heated strip of material sufficient to bring the molecular structure of the metal into intimate contact so a homogeneous and strong continuous area of welded material is formed at the crowns of the corrugations.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. Flexible tube-forming apparatus comprising in combination a mandrel about which a profiled strip of thin flexible metal may be spirally wound, a pair of rollers oppositely disposed at the sides of the mandrel, a welding roller external of the tube, a welding roller eccentrically mounted on the said mandrel internally of the tube in cooperating relation with the said welding roller, and electrical connections whereby an electric welding circuit is established through the welding roller and the said eccentrically mounted roller.

2. Flexible tube-forming apparatus comprising in combination a mandrel about which a profiled strip of thin flexible metal may be spirally wound into tubular form, a pair of holding rollers oppositely disposed at the sides of the mandrel and angularly disposed with respect to the cross-sectional plane of the mandrel, a welding roller external of the tube on the opposite side of the mandrel to the pair of holding rollers first mentioned, an internal welding roller eccentrically mounted on the said mandrel internally of the tube in cooperating relation with the said external welding roller, and electrical connections whereby an electric welding circuit is established through the welding roller and the said eccentrically mounted roller.

3. Flexible tube-forming apparatus comprising in combination a mandrel about which a profiled strip of thin flexible metal may be spirally wound into tubular form having an overlapped side edge, a pair of holding rollers oppositely disposed at the sides of the mandrel, angularly disposed with respect to the cross-sectional plane of the mandrel and also angularly disposed relative to each other, a welding roller external of the tube, a welding roller eccentrically mounted on the said mandrel internally of the tube in cooperating relation with the first mentioned welding roller, and electrical connections whereby an electric welding circuit is established through the welding roller and the said eccentrically mounted roller.

4. Flexible corrugated tube-forming apparatus comprising in combination a rotatable mandrel about which a profiled strip of metal may be wound with an overlapped edge portion, an axle on which the mandrel is mounted, a shaft mounted upon the said axle eccentric to the axis of rotation of the said axle, a welding roller on the said shaft adapted to engage the internal surface of inner overlapped portion of the corrugations on the said tube, a second welding roller external of the said tube adapted to engage the outer overlapped portions of a profiled strip of metal, and electrical connections to each of said welding rollers and forming rollers below the center of the said mandrel and on each side thereof.

5. Flexible corrugated tube-forming apparatus comprising in combination a rotatable mandrel adapted to support a profiled strip of metal wound thereon, an axle on which the mandrel is mounted, a shaft mounted in the end of said axle eccentric to the axis of rotation of the said axle, a welding roller of lesser diameter than the internal diameter of the tube in the said shaft adapted to engage the internal surface of the corrugations on the said tube, a welding roller external of the said tube adapted to engage the outer overlapped portions of a profiled strip of metal, and electrical connections to each of said welding rollers and forming rollers below the center of the said mandrel and on each side thereof.

6. Flexible tube forming apparatus comprising in combination, a mandrel about which a profiled strip of metal may be wound in tubular form, the said strip of metal being generally U-shaped in form with depending side flanges thereon which are overlapped by the said winding, holding rollers on each side of the said mandrel oppositely disposed relative to each other to fit into the external valleys of the tube thus formed on each side of the mandrel and canted to conform to the cross sectional plane of the tube through the external valleys, a welding roller external of the said tube adapted to engage the outer surface of the overlapped flange portions of the metal forming the tube, an inner welding roller eccentrically mounted on the end of the said mandrel and extending into the internal valley of the corrugations opposite the external welding roller and electrical connections to the said welding rollers whereby an electric circuit is established through the said rollers.

7. Flexible corrugated tube forming apparatus comprising in combination, a rotatable mandrel about which a profiled strip of metal may be spirally wound to form a tube, the strip of material being of U-shape with depending curved side flanges in cross section, the edges of the strip as it is being wound being in overlapped rotation with each other, an axle in which the mandrel is mounted, a shaft mounted in the said axle and projecting from the end of the axle eccentric to the axis of the said axle, a welding roller of lesser diameter than the internal diameter of the tube on the end of the said shaft and adapted to engage the internal surface of the tube at the overlapped edges of the strip of metal in the internal valleys of the tube, a second welding roller external of the tube in engagement with the overlapped edges of the material forming the tube at the crests of its external corrugations and opposite the internal welding roller, electrical connections to each of said welding rollers whereby an electric circuit is established through the welding rollers and the wall of the tube, and holding rollers on each side of the mandrel below the center of the said mandrel angularly disposed relative to the mandrel and to each other and adapted to engage the tube in the external valleys thereof and hold the tube against the said mandrel.

References Cited in the file of this patent

UNITED STATES PATENTS

| | | |
|---|---|---|
| 1,681,604 | Winter | Aug. 21, 1928 |
| 2,105,907 | Demers | Jan. 18, 1938 |
| 2,158,796 | Harrah | May 16, 1939 |
| 2,273,027 | Dreyer | Feb. 17, 1942 |
| 2,313,329 | Evert | Mar. 9, 1943 |